United States Patent

Studley

[15] 3,677,159
[45] July 18, 1972

[54] MICROFILM CAMERA
[72] Inventor: David K. Studley, Palo Alto, Calif.
[73] Assignee: Quantor Corporation, Cupertino, Calif.
[22] Filed: July 27, 1970
[21] Appl. No.: 58,380

[52] U.S. Cl. .............................95/31 EL, 242/190, 352/121
[51] Int. Cl. ...................G03b 1/18, G03b 1/54, G03b 21/43
[58] Field of Search .............95/31 R, 31 EL, 12.5; 352/121, 352/157, 159; 242/189, 190

[56] References Cited

UNITED STATES PATENTS

| | | | |
|---|---|---|---|
| 3,547,331 | 12/1970 | Hereford | 352/159 X |
| 2,699,702 | 1/1955 | Cuber | 352/159 X |
| 3,152,331 | 10/1964 | Clay | 95/31 EL |

*Primary Examiner*—Joseph F. Peters, Jr.
*Attorney*—Townsend and Townsend

[57] ABSTRACT

A microfilm camera having a high speed frame advance system comprising a pair of idler arms adapted to control the supply and take-up of microfilm so as to maintain substantially constant tension thereon. An aperture at which the microfilm is photographically exposed and a frame advance drive roller are disposed between the idler arms. The frame advance drive roller is rotatably driven, on demand, by a servomotor which is energized by a digital control circuit. The digital control circuit receives feedback information from a shaft encoder connected to the servomotor and functions to accelerate and decelerate the servomotor in response thereto.

12 Claims, 5 Drawing Figures

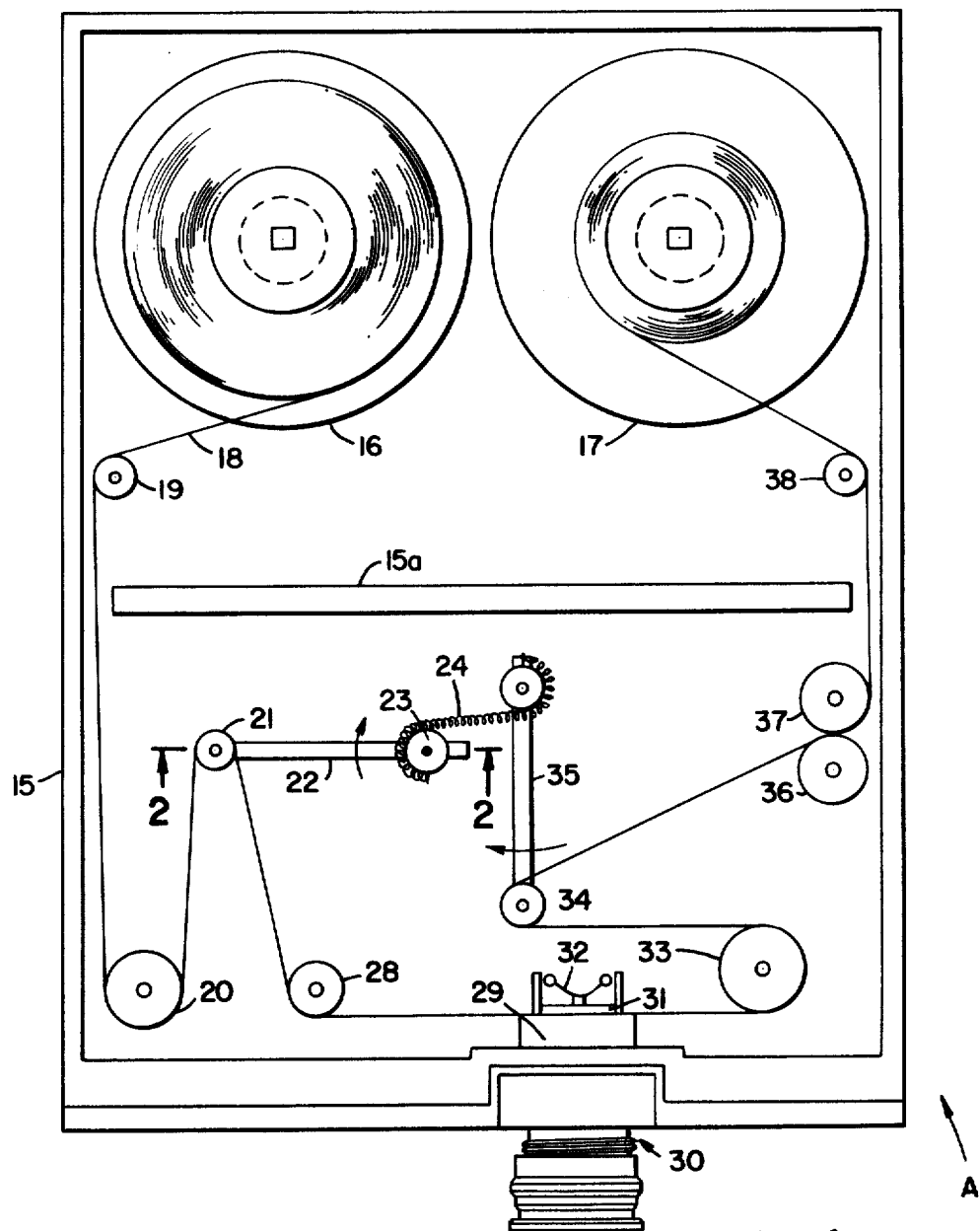
FIG_1
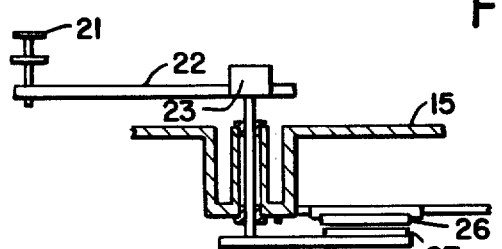
FIG_2
INVENTOR.
DAVID K. STUDLEY
BY
Townsend and Townsend
ATTORNEYS

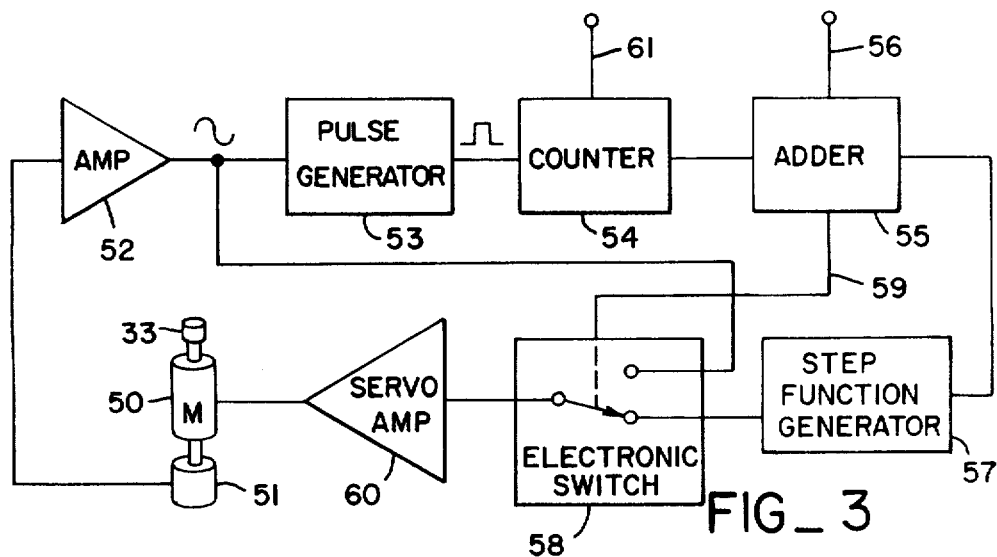
FIG_3
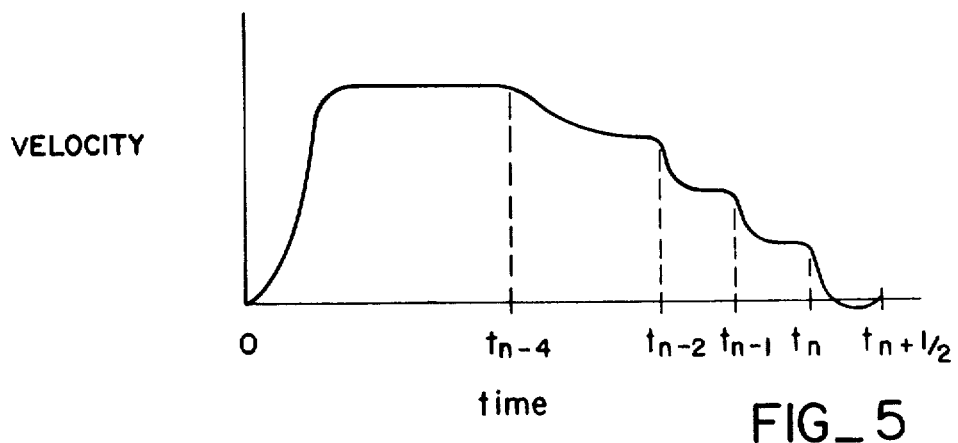
FIG_5
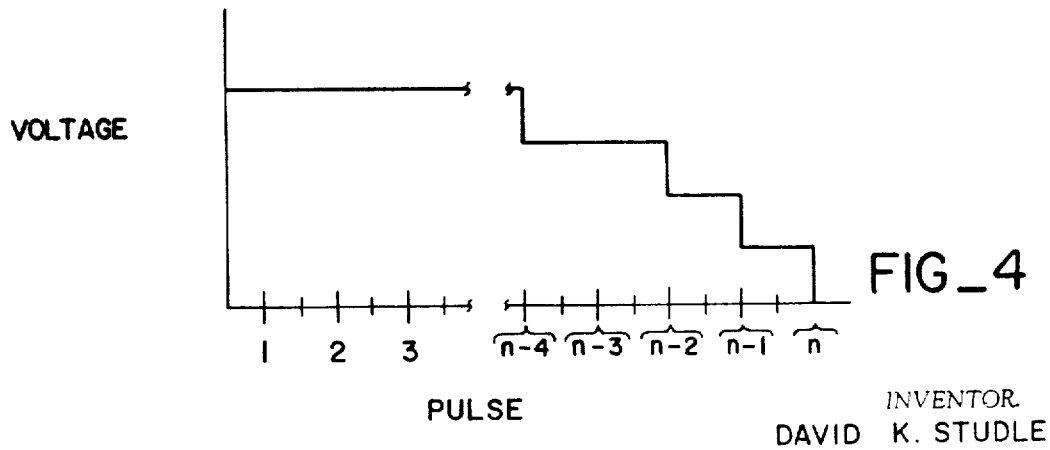
FIG_4
INVENTOR.
DAVID K. STUDLEY
BY
Townsend and Townsend
ATTORNEYS

MICROFILM CAMERA This invention relates to a microfilm camera, and more particularly, to a microfilm camera having a digitally controlled, high speed frame advance system.

In a microfilm camera, information is recorded at discrete intervals, generally referred to as frames, along the length of a strip of microfilm, stored in roll form within or adjacent to the camera. This is accomplished by physically moving the film a desired frame advance increment in relation to a fixed aperture, the desired information being optically imaged at the aperture so as to photographically expose successive frames of the microfilm. In a microfilm camera, unlike a motion picture camera, the frame advance operation must be accomplished on demand, as opposed to at a predetermined rate, so as to produce a plurality of individual still images taken at desired times. It is thus apparent that the speed at which information may be recorded with a microfilm camera is dependent, in part, upon the speed of the frame advance operation. Furthermore, in order to readily permit the retrieval of the information from the microfilm, each frame must be relatively positioned with a high degree of accuracy, thus requiring the frame advance operation to be accomplished with precision. In addition, care must be taken to minimize the stress and slippage to which the microfilm is subjected so as to avoid stretching, fracture, damage to the emulsion or fogging due to static discharge of the microfilm.

In light of the foregoing requirements, previous high speed microfilm cameras have been either unduly complex, costly and unreliable, or have failed to adequately meet these requirements. Accordingly, it is an object of the present invention to provide a microfilm camera having a high speed frame advance system that is relatively simple, inexpensive and reliable.

Another object of the present invention is to provide a high speed microfilm camera having a digitally-controlled frame advance system.

A further object of the present invention is to provide a high speed microfilm camera in which the possibilities of damage to the microfilm and the emulsion thereof are substantially minimized.

Yet another object of the present invention is to provide a high speed microfilm camera particularly adapted for use with non-perforated microfilm.

These objects are met in accordance with the present invention by providing a microfilm camera in which the microfilm path includes a pair of idler rollers mounted for arcuate movement on idler arms which are spring biased along their arcuate paths. A suitable supply of microfilm is contained on a supply reel which is rotatably mounted by a drag brake mechanism. A supply drive roller is disposed along the microfilm path between the supply reel and the first of the idler rollers, the rotation of the supply drive roller being controlled by the arcuate position of the first idler roller. Similarly, a take-up reel having a slip clutch drive is provided, and a take-up drive roller is provided between the second idler roller and the take-up reel, the rotation of the take-up drive roller being controlled by the arcuate position of the second idler roller. The aperture and frame advance mechanism is disposed between the first and second idler rollers along the microfilm path, the idler rollers, supply drive roller, take-up drive roller and supply and take-up reels cooperating to supply and take-up the microfilm in accordance with the frame advance operation while maintaining the microfilm under substantially constant tension.

The frame advance system comprises a frame advance drive roller positioned between the aperture and the second idler roller, the rotation of the frame advance drive roller being controlled by a digital control circuit. The digital control circuit receives feedback information from a shaft encoder rotatably mounted to the frame advance drive roller and functions to control the rotation of the frame advance drive roller in response thereto.

The foregoing is advantageous in that the maintenance of substantially constant tension on the microfilm minimizes microfilm slippage, thus minimizing damage to the emulsion while maximizing the accuracy of the frame advance operation. Furthermore, the minimization of microfilm slippage permits the microfilm to be quickly accelerated and decelerated, thus readily permitting frame advance time intervals which were heretofore substantially unattainable.

These and other objects, features and advantages of the present invention will be more readily apparent from the following detailed description with reference to the accompanying drawings, wherein:

FIG. 1 is a diagrammatic view of a microfilm camera according to the present invention;

FIG. 2 is a cross-sectional, side view of a portion of the microfilm camera depicted in FIG. 1, taken along line 2—2;

FIG. 3 is a block diagram of the digital control circuit of the microfilm camera according to the present invention;

FIG. 4 is a graph of the output voltage of the step function generator portion of the digital control circuit depicted in FIG. 3; and FIg. 5 is a graph of the velocity of the microfilm with respect to time during the frame advance operation.

Referring initially to FIG. 1, there is provided a microfilm camera A according to the present invention. Camera A comprises a light-proof housing 15 within which a supply reel 16 and a take-up reel 17 are contained. Housing 15 may include an interior wall 15a which serves to divide the housing into two portions, one primarily containing the supply and take-up reels, the other containing the remaining components of the camera. A suitable supply of microfilm 18, preferably but not necessarily of the 16 mm non-perforated type, is contained on supply reel 16 in roll form. Supply reel 16 is rotatably mounted by a drag brake mechanism (not shown) in a conventional manner, to provide a tensioned supply of microfilm 18.

The path of microfilm 18 proceeds from supply reel 16 over a guide roller 19 which is rotationally mounted to housing 15, and then over a supply drive roller 20. Supply drive roller 20 is rotationally driven by a supply drive motor (not shown), which motor is energized in a manner to be described hereinafter.

From supply drive roller 20, microfilm 18 passes over an idler roller 21, which is rotatably mounted to the end of an idler arm 22. The other end of idler arm 22 is attached to the end of a shaft 23, which is journaled through housing 15. Idler arm 22 is resiliently biased in the direction indicated by the arrow shown in FIG. 1 by a spring 24. Referring now to FIG. 2, an arm 25 is attached to the other end of shaft 23, so that pivotal movement of idler arm 22 will result in similar pivotal movement of arm 25. A magnetically-operated reed switch 26 is attached to housing 15, in aligned relationship with arm 25 so that arm 25 will be adjacent reed switch 26 when idler arm 22 has been pivoted a predetermined amount due to the movement of microfilm caused by the operation of the frame advance mechanism. Reed switch 26 is electrically connected to the supply drive motor in such a manner that the supply drive motor will be energized when reed switch 26 is actuated. A magnet 27 is attached to the end of arm 25, so that alignment of arm 25 adjacent reed 26 will result in the actuation of reed switch 26, and thus the energization of the supply drive motor. Energization of the supply drive motor will, of course, result in the supply of additional microfilm, thereby permitting idler arm 22 to be pivoted to its initial position by spring 24. In this manner, additional microfilm will periodically be supplied in response to the pivotal movement of idler arm 22.

Referring again to FIG. 1, the microfilm path proceeds from idler roller 21 over a guide roller 28 and thence adjacent an aperture plate 29 having an aperture therein. Microfilm camera A, of course, may include conventional lens and shutter mechanisms, indicated generally at 30, to optically image the desired information on microfilm 18 through the aperture in aperture plate 29. A pressure plate 31 is disposed behind aperture plate 29, microfilm 18 passing between aperture plate 29 and pressure plate 31. A bi-stable spring 32 is disposed behind pressure plate 31, and functions to urge pressure plate 31 against aperture plate 29 so as to maintain microfilm 18 in contact with aperture plate 29. Pressure plate 31 may be retracted from aperture plate 29, by urging pressure plate 31 rearwardly so as to cause bi-stable spring 32 to assume its alternative stable position, thereby readily permitting the threading of the camera.

The path of microfilm 18 then proceeds to a frame advance drive roller 33. Frame advance drive roller 33 is rotatably driven by a frame advance servomotor (not shown), on demand, under control of a digital control circuit in a manner to be described hereinafter. Of course, rotation of frame advance drive roller 33 produces the pivotal movement of idler arm 22 referred to hereinbefore, and the feeding of the supply of microfilm associated therewith by supply drive roller 20.

From frame advance drive roller 33, microfilm 18 proceeds over an idler roller 34, rotatably mounted to the end of an idler arm 35. Idler arm 35 is pivotally mounted at its other end, and is resiliently biased in the direction indicated by the arrow on FIG. 1 by spring 24, in the same manner as described with respect to idler arm 22. Furthermore, a second reed switch (not shown) is associated with idler arm 35 and is actuated by the pivotal movement thereof in a similar, but converse, manner as reed switch 26. Specifically, microfilm 18 proceeds from idler roller 34 to pass between a take-up drive roller 36 and a pressure roller 37. Take-up drive roller 36 is rotated by a take-up drive motor (not shown), the operation of which is controlled by the reed switch associated with idler arm 35. Pressure roller 37 serves to urge microfilm 18 in pressure driving contact with take-up drive roller 36. As microfilm is advanced due to the action of frame advance drive roller 33, idler arm 35 will pivot so as to take-up the slack produced thereby, thus maintaining substantially constant tension on microfilm 18. After idler arm 35 has thus pivoted a predetermined amount, the reed switch associated therewith will be actuated, causing take-up drive roller 36 to be rotated by the take-up drive motor. This, in turn, will return idler arm 35 to its initial position, thus deactuating the reed switch associated therewith so as to de-energize the take-up drive motor. In this manner, microfilm 18 will be periodically taken-up in response to the advancement thereof by frame advance drive roller 33.

From take-up drive roller 36 and pressure roller 37, microfilm 18 passes over a guide roller 38 and thence on to take-up reel 17. Take-up reel 17 is rotatably driven by a conventional slip-clutch mechanism, so that microfilm 18 will be wound on take-up reel 17 as it is fed by take-up drive roller 36, thus completing the path of microfilm 18 through microfilm camera A.

Referring now to FIg. 3, there is shown the digital control circuit associated with the frame advance system of the microfilm camera according to the present invention. Specifically, there is provided a servomotor 50, the shaft of which drives frame advance drive roller 33. A shaft encoder 51 is also connected to the shaft of servomotor 50, so that rotation of servomotor 50 will cause concurrent rotation of shaft encoder 51. The output of shaft encoder 15 is connected to the input of an amplifier 52, which amplifies the quasi-sinesoidal output signal of shaft encoder 51, thus producing an output wave form as depicted in FIG. 3. Of course, each cycle of this wave form represents an incremental amount of rotation of frame advance drive roller 33, and thus an incremental amount of microfilm motion. In a preferred embodiment of the present invention, it is presently contemplated to employ a shaft encoder cycle increment of 0.0588 inches of microfilm motion per shaft encoder cycle. Desired frame advance size may be any multiple of this increment, such as 0.588 inches, which corresponds to ten full cycles, or 0.47 inches, which corresponds to eight full cycles.

The amplified shaft encoder signal present at the output of amplifier 52 is connected to the input of a pulse generator circuit 53. Pulse generator 53 functions to produce an output pulse at the positive-slope zero crossing of the quasi-sinesoidal signal from amplifier 52 as depicted in FIG. 3. This output pulse is of appropriate duration to actuate an electronic binary counter circuit 54. The pulses thus produced by pulse generator 53 are counted by counter circuit 54, the output of which represents the sum of the received input pulses in binary form. Counter circuit 54 includes a reset input 61, which is employed to commence the frame advance operation in a manner to be described hereinafter.

The binary output signal of counter circuit 54 is connected to an adder circuit 55. Adder circuit 55 includes a second binary input 56. An input is provided to input 56 corresponding to the complement, with respect to the capacity of adder circuit 55, of the desired number of shaft encoder cycles, and thus pulses required to produce the desired frame advance. In this manner, any desired frame advance increment within the capacity of adder 55 may be obtained in a manner to be described hereinafter.

The binary output signal of adder circuit 55 is applied to the input of a step function generator circuit 57. Step function generator circuit 57 functions to produce the voltage wave form depicted in FIG. 4, wherein there is depicted the output voltage of step function generator 57 necessary to achieve a frame advance size of $n$ pulse increments, it is apparent that step function generator circuit 57 is adapted to produce a predetermined initial output voltage for all binary input signals less than the capacity of adder circuit 55 minus four, corresponding to pulses 1 through $n-5$. Upon receipt of a binary coded input signal equal to the capacity of adder circuit 55 minus 4, corresponding to pulse number $n-4$, step function generator circuit 57 is adapted to supply a somewhat lower output voltage, as indicated in FIG. 4. Similarly, upon receipt of binary input signals equal to the capacity of adder circuit 55 minus 2 and 1, corresponding to pulses $n-2$ and $n-b\ 1$, step function generator circuit 57 is adapted to supply output voltages of correspondingly lower levels. Step function generator 57 may comprise a plurality of gates or other logic circuitry adapted to detect the presence of the particular binary numbers and to energize appropriate circuitry for the production of the desired output voltages in response thereto.

The output of step function generator 57 is applied to an input of an electronic switch 58. The quasi-sinesoidal output signal of amplifier 52 is applied to the other input of electronic switch 58. The normal position of electronic switch 58 is that depicted in FIG. 3, namely, where the output of step function generator 57 is connected to the output of electronic switch 58. The position of electronic switch 58 is controlled by the carry output 59 of adder circuit 55. Since adder circuit 55 is preset to the complement of the desired number of pulses required to produce the desired frame advance, an output signal will appear at carry output 59 upon receipt of the last pulse, thus causing electronic switch 58 to switch at that time so as to connect the quasi-sinesoidal output signal of amplifier 52 to its output. Electronic switch 58 may comprise one or more field effect transistors adapted to switch in the desired manner.

The output of electronic switch 58 is connected to the input of a servo amplifier 60. The output of servo amplifier 60 is, in turn, connected to servomotor 50, so that servomotor 50, and thus frame advance drive roller 33, will rotate in response to the output signal of electronic switch 58.

In operation, a supply reel 16 containing microfilm 18 in roll form thereon is inserted into the camera, and the microfilm is threaded in accordance with the microfilm path previously described. This may be facilitated by retracting pressure plate 31 from aperture plate 29 by urging pressure plate 31 rearwardly so as to cause bi-stable spring 32 to assume its alternative stable position. After threading has been successfully accomplished, bi-stable spring 32 is urged forwardly so as to cause it to assume its initial stable position wherein pressure plate 31 is suitably urged towards aperture plate 29.

A binary coded input signal corresponding to the complement, with respect to the capacity of adder circuit 55, of the desired number of pulses required to produce the desired frame advance is applied to input 56 of adder circuit 55, thus pre-setting adder circuit 55 to this number. When it is desired to commence the frame advance operation, the logical input signal required to reset counter circuit 54 is applied to reset input 61 thereof, causing counter circuit 54 to reset. This, in turn, causes a change in the binary output signal of adder circuit 55. As previously described, step function generator circuit 57 will then produce an output voltage of a predetermined initial level. This voltage is applied via electronic switch 58 to servo amplifier 60 where it is amplified and applied to servomotor 50.

Referring now to FIG. 5, there is shown the velocity of servomotor 50 with respect to time, the time 0 corresponding to the commencement of the frame advance operation. As is apparent from FIG. 5, the voltage thus applied to servomotor 50 causes it to accelerate until operating speed is reached, at which time the velocity curve flattens.

As the motion of microfilm 18 proceeds, shaft encoder 51 produces output signals in response thereto. These output signals are amplified by amplifier 52 and applied to pulse generator 53, which produces a series of pulses in response thereto. The pulses thus produced are counted by counter circuit 54. This, in turn, causes the binary output of adder circuit 55 to increase. As previously described, step function generator circuit 57 will continue to produce the predetermined initial voltage output until such time as the binary signal applied thereto corresponds to pulse $n-4$. At that time the output voltage of step function generator circuit 57 assumes a somewhat reduced level, causing servomotor 50 to decelerate. This deceleration is graphically depicted in FIG. 5 in the region between $t_{n-4}$ and $t_{n-2}$.

The output voltage of step function generator circuit 57 is again reduced upon arrival of binary signals corresponding to pulses $n-2$ and $n-1$, causing further deceleration of servomotor 50 as graphically depicted in FIG. 5. Upon production of pulse $n$, a signal will appear at the carry output 59 of adder circuit 55, causing electronic switch 58 to change state so as to connect the output signal of amplifier 52 to the input of servo amplifier 60. In this fashion an analog feedback loop is formed which tends to drive servomotor 50 into the position corresponding to the negative-slope zero crossing of the quasi-sinesoidal output signal of shaft encoder 51. Since pulse n was produced at the positive-slope zero crossing of the quasi-sinesoidal output signal of shaft encoder 51, this feedback loop operates to advance the microfilm one-half of a pulse increment. Furthermore, as graphically displayed in FIG. 5 in the region between $t_n$ and $t_{n+1/2}$, the feedback loop may operate to produce negative velocity, or, in other words, to backup the microfilm so as to precisely position the microfilm at the negative-slope zero crossing of the shaft encoder 51 output signal. Since the previous frame advance operation was accomplished in the same manner, it is apparent that the initial condition of shaft encoder 51 was at the negative-slope zero crossing thereof, so that the frame advance thus produced will, in fact, be $n$ pulse increments. Accordingly, the frame advance operation has been accomplished in the desired manner. Furthermore, subsequent frame advance operations may be accomplished, on demand, in an identical manner by applying an appropriate reset signal to reset input 61 of counter circuit 54. Of course, the supply and take-up of microfilm 18 necessitated by the frame advance operation is periodically accomplished under control of idler arms 22 and 35, as previously described.

In a microfilm camera actually constructed according to the present invention, frame advance durations of approximately 35 milliseconds have been attained with a high degree of relative frame positioning accuracy, and without appreciable damage to the microfilm emulsion, thus evidencing the advantages of the present invention referred to hereinbefore.

While a particular embodiment of the present invention has been shown and described, it is apparent that modifications or adaptations may be made without departing from the spirit and scope of the invention, as set forth in the claims.

What is claimed is:

1. A microfilm camera comprising: a lightproof housing, a supply reel containing microfilm in roll form, an aperture plate having an aperture therein, said microfilm passing adjacent said aperture, means optically imaging desired information on said microfilm through said aperture, frame advance means for moving said microfilm a predetermined amount relative to said aperture on demand, supply means independent of said frame advance means for supplying said microfilm from said supply reel under substantially constant tension in response to the movement of said microfilm by said frame advance means, a take-up reel and take-up means independent of said frame advance means for taking-up said microfilm on said take-up reel under substantially constant tension in response to the movement of said microfilm by said frame advance means.

2. Apparatus according to claim 1 wherein said supply means comprises a supply drive roller, said microfilm passing over said supply drive roller, a supply drive motor rotatably mounted to said supply drive roller, a pivotally mounted idler arm engaging said microfilm, said idler arm being disposed between said supply drive roller and said frame advance means along the path of said microfilm, means resiliently biasing said idler arm along its arcuate path, and means energizing said supply drive motor in response to the arcuate position of said idler arm.

3. Apparatus according to claim 1 wherein said take-up means comprises a take-up drive roller, said microfilm passing over said take-up drive roller, a take-up drive motor rotatably mounted to said take-up drive roller, a pivotally mounted idler arm engaging said microfilm, said idler arm being disposed between said frame advance means and said take-up drive roller along the path of said microfilm, means resiliently biasing said idler arm along its arcuate path, and means energizing said take-up drive motor in response to the arcuate position of said idler arm.

4. A microfilm camera comprising: a lightproof housing, a supply reel containing microfilm in roll form, said supply reel being rotatably mounted by a drag brake mechanism within said housing, a take-up reel rotatably mounted by a slip clutch mechanism within said housing, said microfilm passing along a path from said supply reel to said take-up reel, imaging means for optically imaging desired information on said microfilm at a location along said path, frame advance means for advancing said microfilm relative to said imaging means on demand, said frame advance means being disposed between said imaging means and said take-up reel along said path, supply means independent of said frame advance means for supplying said microfilm from said supply reel under substantially constant tension in response to the movement of said microfilm by said frame advance means, said supply means being disposed between said supply reel and said imaging means along said path, and take-up means independent of said frame advance means for taking-up said microfilm on said take-up reel under substantially constant tension in response to the movement of said microfilm by said frame advance means, said take-up means being disposed between said frame advance means and said take-up reel along said path.

5. Apparatus according to claim 4 wherein said imaging means comprises an aperture plate having an aperture therein, a pressure plate disposed adjacent said aperture plate, said microfilm passing between said aperture plate and said pressure plate, means resiliently urging said pressure plate towards said aperture plate, and optical means imaging desired information on said microfilm through said aperture.

6. Apparatus according to claim 5 wherein said resilient urging means comprises a bi-stable spring disposed behind said pressure plate, said spring urging said pressure plate towards said aperture plate.

7. A microfilm camera comprising: a light-proof housing, a supply reel containing microfilm in roll form, an aperture plate having an aperture therein, said microfilm passing adjacent said aperture, means optically imaging desired information on said microfilm through said aperture, a frame advance roller, said microfilm passing over said frame advance roller, a servomotor rotatably connected to said frame advance roller, a shaft encoder rotatably connected to said servomotor, control circuit means for applying voltage to said servomotor, on demand, in response to the output signal of said shaft encoder to move said microfilm a predetermined amount relative to said aperture, supply means for supplying said microfilm from said supply reel under substantially constant tension in response to the movement of said microfilm by said frame advance roller, a take-up reel and take-up means for taking-up said microfilm on said take-up reel under substantially constant tension in response to the movement of said microfilm by said frame advance roller.

8. Apparatus according to claim 7 wherein said control circuit means includes means for generating pulses in response to the output signal of said shaft encoder, means for counting said pulses, and means for varying the voltage applied to said servomotor in response to the sum of said pulses.

9. A microfilm camera comprising: a light-proof housing, a supply reel containing microfilm in roll form, an aperture plate having an aperture therein, said microfilm passing adjacent said aperture, means optically imaging desired information on said microfilm through said aperture, frame advance means for moving said microfilm a predetermined amount relative to said aperture on demand, a supply drive roller, said microfilm passing over said supply drive roller, a supply drive motor rotatably mounted to said supply drive roller, a pivotally mounted idler arm engaging said microfilm, said idler arm being disposed between said supply drive roller and said frame advance means along the path of said microfilm, means resiliently biasing said idler arm along its arcuate path, an arm having a magnet thereon pivotally connected to said idler arm, and a magnetically-actuated reed switch disposed at a predetermined position relative to the arcuate path of said arm, said switch energizing said supply drive motor in response to the arcuate position of said idler arm to supply said microfilm from said supply reel under substantially constant tension in response to the movement of said microfilm by said frame advance means, a take-up reel and take-up means for taking-up said microfilm on said take-up reel under substantially constant tension in response to the movement of said microfilm by said frame advance means.

10. A microfilm camera comprising: a light-proof housing, a supply reel containing microfilm in roll form, an aperture plate having an aperture therein, said microfilm passing adjacent said aperture, means optically imaging desired information on said microfilm through said aperture, frame advance means for moving said microfilm a predetermined amount relative to said aperture on demand, supply means for supplying said microfilm from said supply reel under substantially constant tension in response to the movement of said microfilm by said frame advance means, a take-up reel, a take-up drive motor rotatably mounted to said take-up drive roller, a pivotally mounted idler arm engaging said microfilm, said idler arm being disposed between said frame advance means and said take-up drive roller along the path of said microfilm, means resiliently biasing said idler arm along its arcuate path, an arm having a magnet thereon pivotally connected to said idler arm, and a magnetically-actuated reed switch disposed at a predetermined position relative to the arcuate position of said arm, said switch energizing said take-up drive motor in response to the arcuate position of said idler arm to take-up said microfilm on said take-up reel under substantially constant tension in response to the movement of said microfilm by said frame advance means.

11. A microfilm camera comprising: a light-proof housing, a supply reel containing microfilm in roll form, said supply reel being rotatably mounted by a drag brake mechanism within said housing, a take-up reel rotatably mounted by a slip clutch mechanism within said housing, said microfilm passing along a path from said supply reel to said take-up reel, imaging means for optically imaging desired information on said microfilm at a location along said path, a frame advance roller disposed between said imaging means and said take-up reel along said path, said microfilm passing over said frame advance roller, a servomotor rotatably connected to said frame advance roller, a shaft encoder rotatably connected to said servomotor, control circuit means for applying voltage to said servomotor, on demand, in response to the output signal of said shaft encoder to advance said microfilm relative to said imaging means on demand, supply means for supplying said microfilm from said supply reel under substantially constant tension in response to the movement of said microfilm by said frame advance roller, said supply means being disposed between said supply reel and said imaging means along said path, and take-up means for taking-up said microfilm on said take-up reel under substantially constant tension in response to the movement of said microfilm by said frame advance roller, said take-up means being disposed between said frame advance roller and said take-up reel along said path.

12. Apparatus according to claim 11 wherein said control circuit means includes means for generating pulses in response to the output signal of said shaft encoder, means for counting said pulses, and means for varying the voltage applied to said servomotor in response to the sum of said pulses.

* * * * *